Feb. 22, 1949. R. W. DINZL 2,462,308
INJECTION MOLDING MACHINE
Filed Oct. 25, 1945
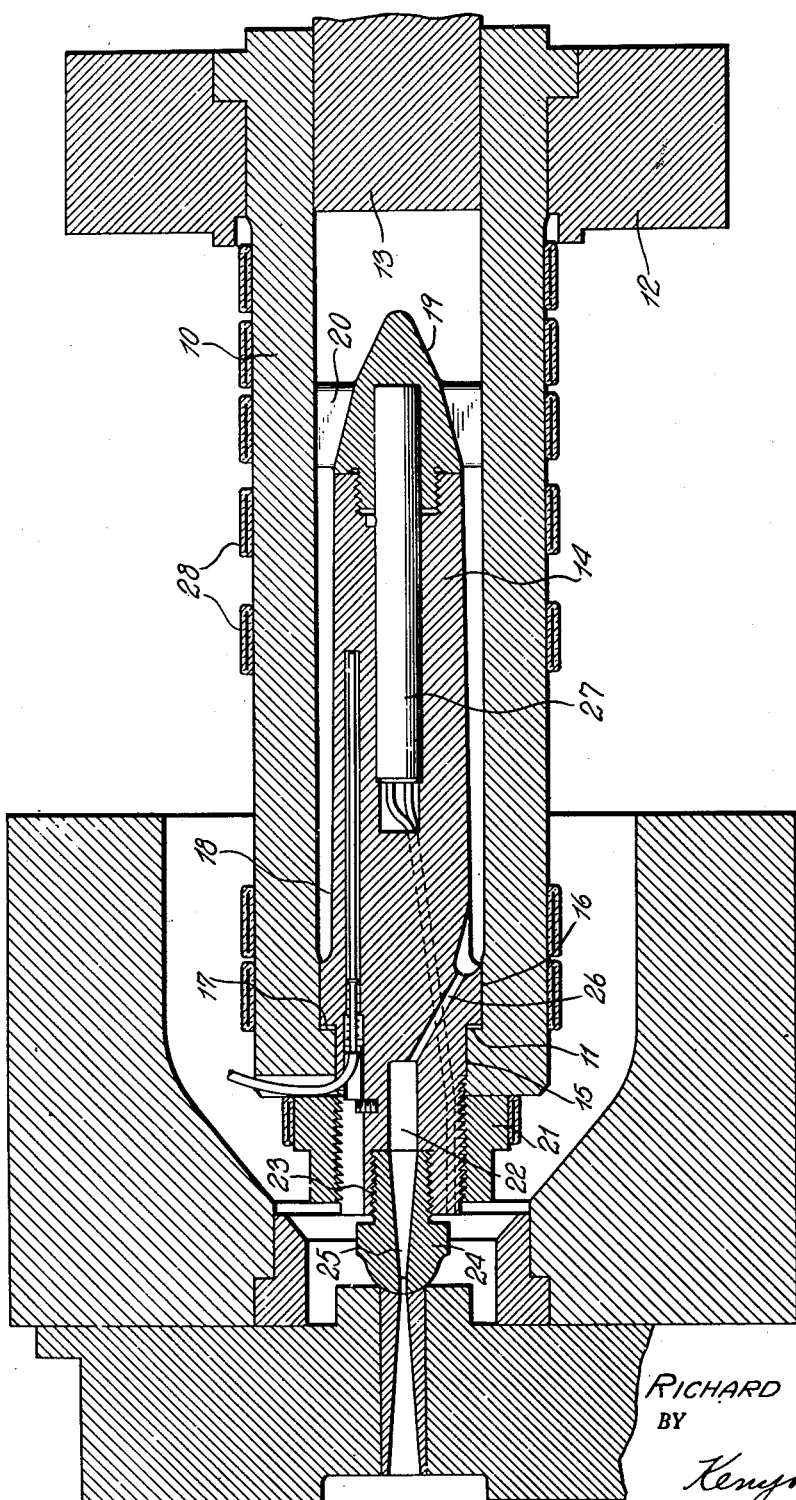
INVENTOR.
RICHARD W. DINZL
BY
Kenyon & Kenyon
ATTORNEYS Patented Feb. 22, 1949

2,462,308

UNITED STATES PATENT OFFICE 2,462,308

INJECTION MOLDING MACHINE

Richard W. Dinzl, Westfield, N. J., assignor to The Watson-Stillman Co., Roselle, N. J., a corporation of New Jersey Application October 25, 1945, Serial No. 624,448

4 Claims. (Cl. 18—30)

This invention relates to injection molding machines.

In an injection molding machine, it is customary to provide a spreading member or torpedo in the heating or injection cylinder for the purpose of facilitating plasticizing of the molding material. Heretofore, difficulty has been encountered in preventing leakage of plasticized molding material through the joint between the torpedo and the cylinder.

An object of this invention is to provide a leak-proof joint between an injection molding machine heating cylinder and a torpedo or spreader arranged within the cylinder.

According to this invention, the cylinder is provided at its discharge end with an inwardly directed flange and the torpedo is provided with an annular shoulder fitting the cylinder and engaging the flange. A threaded portion of the torpedo extends through the flange and is provided with a nut engaging one end of the cylinder and effective to draw the torpedo shoulder toward the cylinder flange. The pressure existing within the cylinder tends to force the torpedo shoulder toward the cylinder flange, thereby increasing the effectiveness of the seal between the torpedo and the cylinder.

Other objects, novel features and advantages of this invention will become apparent from the following specification and accompanying drawings, wherein the single figure is a section through an injection molding machine cylinder embodying the invention.

In the drawing, 10 designates the injection or heating cylinder of an injection molding machine and at its discharge end, the cylinder 10 is provided with an inwardly directed integral flange 11. The cylinder is supported in a frame 12 and a plunger 13 is slidable in the cylinder. Means (not shown) are provided for effecting reciprocation of the plunger 13.

Within the cylinder 10 there is provided a torpedo 14 having a first portion 15 of the same exterior diameter as the interior diameter of the flange 11 and extending therethrough. A second portion 16 of the torpedo is of the same exterior diameter as the interior diameter of the cylinder and one annular face of the portion 16 opposes the inner annular face of the flange 11 with a gasket 17 interposed between said faces. A third portion 18 of the torpedo is of less diameter than the cylinder 10 and terminates in a cone-shaped removable head 19 having a plurality of radial extensions 20 engaging the surface of the cylinder 10. The portion 15 projects beyond the discharge end of the cylinder 10 and is threaded to receive a nut 21 engaging the discharge end of the cylinder and serving to retain the torpedo in position within the cylinder with the gasket 17 under compression. The torpedo 14 is introduced into the cylinder 10 at the end of the cylinder opposite the flange 11.

In the portion 15 there is provided a central bore 22 terminating in a tapped recess 23 of enlarged diameter. A nozzle 24 has a threaded stem screwed into the recess 23 and is provided with a central passageway 25 communicating with the bore 22. Passageways 26 lead from the bore 22 through the torpedo portion 16 to the annular space between the torpedo portion 18 and the inner surface of the cylinder.

Within the torpedo there is provided an electrical heating unit 27 and electrical heating bands 28 are provided around the exterior of the cylinder 10. These heating units serve to maintain the desired temperature within the cylinder.

Thermoplastic molding material is supplied to the cylinder 10 between the torpedo head 19 and the plunger 13 in any suitable manner and leftward movement of the plunger 13 forces the thermoplastic material around the torpedo 14 and through the annular space between the torpedo and the cylinder in which it is sufficiently heated to become liquid. The liquefied thermoplastic material then passes by way of the passageways 26 and bore 22 into the nozzle passageway 25 from which it is discharged into a mold.

The provision of the enlarged portion 16 in combination with the flange 11 and gasket 17 results in a hermetical seal of the joint between the torpedo and the cylinder to prevent leakage of plasticized molding material from the cylinder under the injection pressure. The pressure applied to the plasticized material in the cylinder is transmitted to the enlarged portion 16 and tends to bias said portion toward the flange 11 to tighten the seal between the cylinder and the torpedo, thereby effectively preventing leakage between the torpedo and the cylinder.

It follows from the above that whenever the pressure is increased on the material in the injection cylinder 10, due to advance of the injection plunger 13, the pressure increases between the registered faces of the torpedo's flange 16 and the injection cylinder's flange 11. This automatically follows from the fact that the inside face of the injection cylinder's flange 11 provides the reaction for the pressure applied to the inside face of the torpedo's flange 16, by the injection molding material in the injection cylinder 10.

The part 15, of the torpedo's base; which projects backwardly from the torpedo's flange 16, which is also part of its base; extends beyond the outer face of the injection cylinder's flange 11. As previously explained, this extending part of the torpedo is screw-threaded, and the nut 21 engages this outer face of the cylinder's flange. When this nut is screwed up it applies the initial pressure between the mentioned registered flange faces, and it must do this by applying longitudinal tension to the extending part 15. This stresses the screw threads, and it is desirable to avoid further stressing of these threads. Any further stressing is avoided with the construction disclosed herein, the additional pressure required to seal the mutually registered faces, of the two flanges, actually decreasing the tension on the part 15 and hence actually relieving the stress on the threads.

That is to say, as the plunger 13 advances and applies the high pressures, required for injection molding, to the material in the injection cylinder 10, the pressure rises on the sealing faces of the two flanges, while the stress is reduced on the screw threads, from the stress they had to carry to effect initial sealing.

The radial extensions or struts 20 maintain the torpedo and its base parts truly concentric respecting the inside of the cylinder 10 and its flange 11. This provides the result of maintaining the mutually registered flange faces truly parallel at all times. This, in turn, assures a uniformly distributed sealing pressure, regardless of the possibility that the inside face of the torpedo's flange, which functions as an annular piston, might not be symmetrically loaded with the pressure of the molding material. For example, such lack of symmetry might result from an unsymmetrical arrangement of the passageways 26, or because of momentary clogging of one of these passageways. Were it not for these struts, unsymmetrical loading, such as mentioned, might cause tilting of the torpedo and its base parts, the torpedo body of necessity extending from its base parts in spaced relation respecting the inside of the injection cylinder.

I claim:

1. An injection molding machine sub-combination comprising an injection cylinder having an open outlet end provided with an inwardly directed flange, an injection plunger in said cylinder for forcing molding material through said cylinder's outlet end when said plunger is advanced theretowards, and a torpedo pointing toward said plunger inside said cylinder and having a base at said cylinder's outlet end with said base including an outwardly directed flange with the latter's inner face exposed to the inside of said cylinder to receive forwardly directed force from the molding material therein during said plunger's advance and with its outer face registering with the inner face of said cylinder's flange with the latter providing the reaction for said force, said torpedo being a separate part relative said cylinder and having at least one passage through which the molding material is forced from said cylinder's outlet end but otherwise sealing the latter by the pressure between said registered flange faces, whereby said sealing increases in effectiveness with increasing pressure on the molding material in said cylinder, during said plunger's advance, due to the resulting simultaneous increase in said pressure between said registered faces.

2. The sub-combination defined by claim 1 with said torpedo's base having a screw-threaded part extending from said base's flange through said cylinder's outlet end to beyond the outer face of said cylinder's flange and provided with a nut engaging the latter's outer face to longitudinally tension said part and apply initial pressure between said registered flange faces, whereby increasing pressure on material in said cylinder, effecting said increase in pressure between said faces, simultaneously decreases said tension on said part and reduces the stress on the screw-threads on said part and said nut.

3. The sub-combination defined by claim 1 with said torpedo's passage opening locally from said torpedo flange's inside face, said torpedo extending from its said base in spaced relation respecting the inside of said cylinder but remotely from its said base being provided with radial struts continuously maintaining it and its said base concentric relative said cylinder's inside and said cylinder's flange, whereby said pressure between said registered faces is maintained substantially balanced annularly thereof by said struts preventing tilting of said torpedo and its said base.

4. An injection molding machine sub-combination comprising an injection cylinder having an open outlet end provided with an inwardly directed flange, an injection plunger in said cylinder for forcing molding material through said cylinder's outlet end when said plunger is advanced theretowards, and a torpedo pointing toward said plunger inside said cylinder and having a base at said cylinder's outlet end with said base including an outwardly directed flange with the latter's inner face exposed to the inside of said cylinder to receive forwardly directed force from the molding material therein, during said plunger's advance, and with its outer face registering with the inner face of said cylinder's flange with the latter providing the reaction for said force, said torpedo being a separate part relative said cylinder and having at least one passage through which the molding material is forced from said cylinder's outlet end but otherwise sealing the latter by the pressure between said registered flange faces, whereby said sealing increases in effectiveness with increasing pressure on the molding material in said cylinder, during said plunger's advance, due to the resulting simultaneous increase in said pressure between said registered faces, said torpedo's base having a screw-threaded part extending from said base's flange through said cylinder's outlet end to beyond the outer face of said cylinder's flange and provided with a nut engaging the latter's outer face to longitudinally tension said part and apply initial pressure between said registered flange faces, whereby increasing pressure on material in said cylinder, effecting said increase in pressure between said faces, simultaneously decreases said tension on said part and reduces the stress on the screw-threads on said part and said nut, said torpedo's passage opening locally from said torpedo flange's inside face, said torpedo extending from its said base in spaced relation respecting the inside of said cylinder but remotely from its said base being provided with radial struts continuously maintaining it and its said base concentric relative said cylinder's inside and said cylinder's flange, whereby said pressure between said registered faces is maintained substantially balanced annularly thereof by said struts preventing tilting of said torpedo and its said base.

RICHARD W. DINZL.

REFERENCES CITED

The following references are of record in the file of this patent:

UNITED STATES PATENTS

| Number | Name | Date |
|---|---|---|
| 2,233,558 | Shaw | Mar. 4, 1941 |
| 2,358,354 | Stacy | Sept. 19, 1944 |